(12) United States Patent
Walker

(10) Patent No.: US 8,499,318 B2
(45) Date of Patent: Jul. 30, 2013

(54) METHOD AND APPARATUS FOR PROGRAMMING BLACKOUT AND RETUNE

(75) Inventor: Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 12/472,253

(22) Filed: May 26, 2009

(65) Prior Publication Data

US 2009/0235301 A1 Sep. 17, 2009

Related U.S. Application Data

(62) Division of application No. 11/122,493, filed on May 4, 2005, now Pat. No. 7,555,012.

(60) Provisional application No. 60/568,182, filed on May 4, 2004, provisional application No. 60/664,452, filed on Mar. 22, 2005.

(51) Int. Cl.
*H04N 5/445* (2011.01)
*H04N 7/16* (2011.01)
*H04K 1/00* (2006.01)
*H04N 7/173* (2011.01)

(52) U.S. Cl.
USPC .................. 725/36; 725/25; 725/28; 725/146

(58) Field of Classification Search
USPC ........................ 725/36, 140, 25, 95, 28, 146
See application file for complete search history.

(56) References Cited

U.S. PATENT DOCUMENTS

| 5,235,643 | A | * | 8/1993 | Anderson et al. ............... 380/33 |
| 5,592,470 | A | * | 1/1997 | Rudrapatna et al. .......... 370/320 |
| 5,594,726 | A | * | 1/1997 | Thompson et al. ........... 370/485 |
| 6,029,045 | A | | 2/2000 | Picco et al. |
| 7,555,012 | B2 | | 6/2009 | Walker |
| 2001/0026319 | A1 | | 10/2001 | Honey et al. |
| 2001/0048463 | A1 | | 12/2001 | Lunden |
| 2002/0129383 | A1 | * | 9/2002 | Wasilewski ................... 725/139 |
| 2002/0152317 | A1 | | 10/2002 | Wang et al. |

(Continued)

FOREIGN PATENT DOCUMENTS

| CL | 1040-2005 | 12/2005 |
| CL | 1043-2005 | 12/2005 |

(Continued)

OTHER PUBLICATIONS

International Search Report—PCT/US05/015459, International Search Authority—European Patent Office, Sep. 15, 2005.

(Continued)

*Primary Examiner* — Pankaj Kumar
*Assistant Examiner* — Reuben M Brown
(74) *Attorney, Agent, or Firm* — Fulbright & Jaworski LLP

(57) ABSTRACT

A method for blackout and retune distribution including receiving a first wide area multiplexed feed, the first wide area multiplexed feed comprising a blacked out feed; and generating a requantized local service feed from a local replacement plus retune service feed, the local replacement plus retune service feed having a retune feed corresponding to a retune programming for the blacked out feed, wherein the requantized local service feed is to be combined with the first wide area multiplexed feed for transmission as a part of an aggregate local outbound traffic. A computer-readable medium, a apparatus and a means for blackout and retune distribution is also disclosed.

42 Claims, 13 Drawing Sheets

U.S. PATENT DOCUMENTS

| | | | | |
|---|---|---|---|---|
| 2002/0194595 A1* | 12/2002 | Miller et al. | | 725/36 |
| 2003/0126594 A1 | 7/2003 | Tsuria et al. | | |
| 2004/0133907 A1* | 7/2004 | Rodriguez et al. | | 725/14 |
| 2005/0212504 A1 | 9/2005 | Revital et al. | | |
| 2006/0041921 A1* | 2/2006 | Hane | | 725/117 |
| 2006/0161952 A1 | 7/2006 | Herz et al. | | |
| 2007/0085908 A1 | 4/2007 | Honey et al. | | |
| 2008/0163304 A1 | 7/2008 | Ellis | | |
| 2009/0178074 A1* | 7/2009 | Ellis | | 725/28 |
| 2009/0235301 A1* | 9/2009 | Walker | | 725/28 |
| 2012/0151522 A1* | 6/2012 | de Heer | | 725/34 |

FOREIGN PATENT DOCUMENTS

| | | |
|---|---|---|
| CL | 1047-2005 | 12/2005 |
| CL | 1041-2005 | 1/2006 |
| EP | 1 182 890 | 11/2007 |

OTHER PUBLICATIONS

Written Opinion—PCT/US05/015459, International Search Authority—European Patent Office, Sep. 16, 2005.

International Preliminary Report on Patentability—PCT/US05/015459, IPEA/US, Dec. 5, 2007.

Weiss S. M., "Switching Facilities in MPEG-2: Necessary But Not Sufficient ",SMPTE Journal, SMPTE Inc. Scarsdale, N. Y, US vol. 104, No. 12, Dec. 1, 1995 pp. 788-802, XP000543847 ISSN:0036-1682.

Taiwan Search Report—TW094114477—TIPO—Mar. 15, 2012, p. 1.

* cited by examiner

METHOD AND APPARATUS FOR PROGRAMMING BLACKOUT AND RETUNE

CLAIM OF PRIORITY UNDER 35 U.S.C. §119

This application is a Divisional Application of U.S. patent application Ser. No. 11/122,493 entitled "METHOD AND APPARATUS FOR PROGRAMMING BLACKOUT AND RETUNE" filed May 4, 2005 which claims priority to Provisional Application No. 60/568,182 entitled "MEDIAFLO BLACKOUT AND RETUNE OPTIONS" filed May 4, 2004, and Provisional Application No. 60/664,452 entitled "SYSTEM FOR PROGRAMMING BLACKOUT AND RETUNE" filed Mar. 22, 2005, assigned to the assignee hereof and hereby expressly incorporated by reference herein.

BACKGROUND

1. Field

The embodiments of the system described herein relates generally to providing alternative program material in a media distribution system during a blackout, and more particularly, to a system for programming blackout and retune.

2. Background

It is desirable to deliver multimedia (video and audio content) to large numbers of consumers. It is also desirable that this delivery system be able to deliver a large amount of multimedia content to these subscribers. Because wireless handheld devices are becoming more functional and widely distributed, one approach would be to create a broadcast content delivery system for cellular radio networks, which has the ability to provide users the experience of viewing real-time media. The system has to be an end-to-end system that enables cellular network operators to enhance their multimedia service offerings over their current networks while scaling over time as operators roll out network enhancements. To content providers, the system has to offer the opportunity to leverage their existing content and extend their brands into the wireless space. Thus, the system has to be deliberately designed to provide consumers with a high-quality experience with video and audio on their wireless handsets.

A single frequency network (SFN) as applied to a wireless broadcast network, may be used. The robust design of a wide area service using SFN is partly predicated on the availability of wide area programming, or "services," that is distributed over large areas in a single format—i.e., all transmissions in the large area are the same. In other words, the identical programming signals, such as CNN and/or ESPN, is provided to multiple services areas. This can allow overlapping signal coverage of adjacent service areas to add constructively in an appropriately designed SFN, where each transmitter radiates the same bit on the same frequency, at the same time to provide a more robust network. This, in turn, requires decrypting keystreams to be identical. Thus, a necessary condition for SFN to function properly is that the "wide area" programming is bit and symbol exact at the physical layer as transmitted from all adjacent service areas.

Currently, wide area cable programmers that offer live event programming are often subject to contracts that define blackout areas for the live event programming. For example, ESPN usually has to blackout games that are associated with the home markets of the teams. In these geographical areas, the rights to the games may have been sold to a regional network, ad hoc network, or a pay per view service. In order to support these contractual obligations, the cable programmer or broadcaster offers alternate programming during the blackout, referred to as retune or replacement programming. The satellite receiver at the cable head end may make replacement programming available. The programmer uses an in-band protocol from the cable programmer's head end to control the retune process in a satellite receiver in the cable programmer's head end. However, the presence of a retune event causes a service to no longer match the "wide area feed." The retune event changes the character of the retuned service to be more similar to a local feed that, by definition, is different from other local feeds in adjacent local area operation infrastructure (LOI) service areas. These "local services" likely have independent program keys, and key streams. Consequently, the signal for the retuned service will interfere with, and, conversely, be affected by, the signals for the programming in other LOI service areas and decrease the effectiveness of the SFN network.

Accordingly, there is a need to overcome the issues noted above.

SUMMARY

The description encompasses an apparatus and method in a media broadcast system for supporting blackout and retuning during substitution of programming due to contractual obligation in a geographical area.

In one embodiment, an apparatus for blackout and retune distribution includes a multiplex receiving a blacked out feed and a non-blacked out feed; a retune multiplex receiving the non-blacked out feed and a retune feed corresponding to a retune programming for the blacked out feed; and, a combiner coupled to the multiplex and the retune multiplex, wherein the combiner provides an aggregate outbound traffic including the non-blacked out feed, the blacked out feed and the retune feed.

In a second embodiment, the apparatus for blackout and retune distribution includes a wide area multiplex receiving at least one non-blacked out feed, the wide area multiplex providing an aggregate wide area outbound traffic; and, a local multiplex coupled to the wide area multiplex and receiving the aggregate wide area outbound traffic, at least one local feed, and a retune feed, wherein the local multiplex provides an aggregate local outbound traffic.

In a third embodiment, the apparatus for blackout and retune distribution includes a wide area multiplex receiving a non-blacked out feed and a blacked out feed, the wide area multiplex providing an aggregate wide area outbound traffic; a wide area re-multiplex coupled to the wide area multiplex, the wide area re-multiplex receiving a retune feed corresponding to a retune programming for the blacked out feed, the wide area re-multiplex configured to replace the blacked out feed from the aggregate wide area outbound traffic with the retune feed; and, a local multiplex coupled to the wide area re-multiplex and receiving the non-blacked out feed, the retune feed and a local feed, wherein the local multiplex provides an aggregate local outbound traffic.

In a fourth embodiment, the apparatus for blackout and retune distribution includes a wide area multiplex receiving a non-blacked out feed and a blacked out feed; a combiner coupled to the wide area multiplex and receiving the non-blacked out feed and the blacked out feed, the combiner further receiving a retune feed corresponding to a retune programming for the blacked out feed, the combiner providing an aggregate wide area outbound traffic; a splitter coupled to the combiner, the splitter configured to separate the aggregate wide area outbound traffic into the retune feed, the blacked out feed and the non-blacked out feed; a wide area re-multiplex coupled to the splitter, the wide area re-multiplex receiving the retune feed and the blacked out feed, the wide area re-multiplex configured to replace the blacked out feed with the retune feed; and, a local multiplex coupled to the wide area re-multiplex and receiving the non-blacked out feed, the retune feed and a local feed, wherein the local multiplex provides an aggregate local outbound traffic.

In a fifth embodiment, the apparatus for blackout and retune distribution includes a wide area multiplex receiving a non-blacked out feed and a blacked out feed, the wide area multiplex providing an aggregate wide area outbound traffic; a local multiplex receiving a retune feed corresponding to a retune programming for the blacked out feed and a local feed; and, a combiner coupled to the wide area multiplex and the local multiplex, the combiner receiving the non-blacked out feed, the retune feed and a local feed, wherein the combiner provides an aggregate outbound traffic.

In a sixth embodiment, the apparatus for blackout and retune distribution includes a first wide area multiplex receiving a non-blacked out feed and a blacked out feed, the first wide area multiplex providing a first aggregate wide area signal; a local replacement plus retune service multiplex receiving a local replacement feed and a retune feed corresponding to a retune programming for the blacked out feed; a wide area combiner coupled to the first wide area multiplex and the local replacement plus retune service multiplex, the wide area combiner receiving the non-blacked out feed, the blacked out feed, the retune feed and the local replacement feed; a requantizer coupled to the wide area combiner to receive the local replacement feed and the retune feed, the requantizer generating a requantized local service from the local replacement feed and the retune feed; and, a local combiner coupled to the requantizer and the combiner, the local combiner receiving the blacked out feed, the non-blacked out feed and the requantized local service, wherein the local combiner provides an aggregate local outbound traffic including the blacked out feed, the non-blacked out feed, and the requantized feed.

Other objects, features and advantages will become apparent to those skilled in the art from the following detailed description. It is to be understood, however, that the detailed description and specific examples, while indicating preferred embodiments, are given by way of illustration and not limitation. Many changes and modifications within the scope may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

The description provides a method and apparatus in a media broadcast system for supporting blackout and retuning during substitution of programming due to contractual obligation in a geographical area. The geographical area may be defined by coordinates, markets, or ZIP codes. Blackout refers to the exclusion of wide area programming for the geographical area that is excluded from an otherwise wide area programming distribution of a specific service. A feed refers to a specific multiplex of channels. Under this definition the wide area operation infrastructure (WOI) may create multiple "feeds" that support specific geographic areas. A retune feed contains alternate programming for a blacked out region. In one embodiment, there is an automated messaging system that commands the satellite receiver at a cable head end to retune to another service in the same multiplex, different transponder, or different satellite to find the alternate programming. An "in-band" control signal for the retune system is carried in the same physical channel as the programming. The location control of the satellite retune system can be quite fine (e.g., one ZIP code). The system is expected to operate on a local area operation infrastructure (LOI) by LOI basis—e.g., many ZIP codes. This may be acceptable to programmers, since a LOI's area is nominally a single market. In one embodiment, the system implements an single frequency network (SFN).

Figure 1:
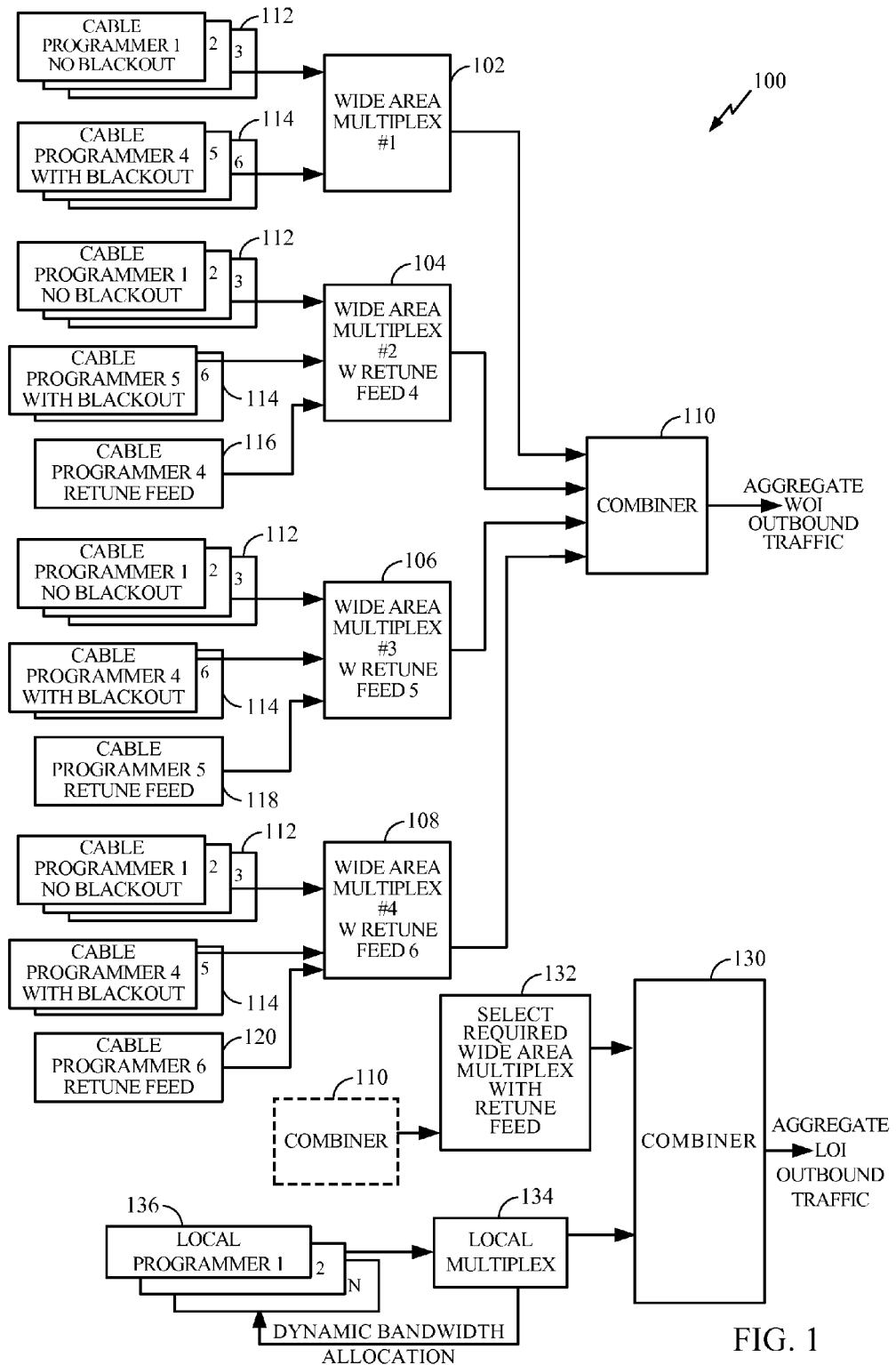
FIG. 1 is a diagram for an apparatus for retune programming redistribution wherein the retune programming redistribution is from the wide area operation infrastructure (WOI)

FIG. 1 illustrates a system 100 for redistribution of retune programming from the WOI, wherein the retune programming is captured at the WOI and distributed to one or more LOIs. The replacement programming is multiplexed onto a retune feed that is similar to a wide area feed, but contains the replacement programming. This adds at least one full and quite possibly two multiplexes to the outbound traffic of the WOI for each blackout active within the system at a given point in time. As illustrated in FIG. 1, the programming from cable programmers 1-6 are multiplexed through a set of wide area multiplexes, including a wide area multiplex #1 102, a wide area multiplex #2 104, a wide area multiplex #3 106 and a wide area multiplex #4 108 multiplex. Programming 114 from cable programmers 4-6 have blacked out content, but each providing respective retune feeds that are multiplexed using a wide area multiplex. Thus, wide area multiplex #2 104 multiplexes programming 112 from cable programmer 1-3 as well as blacked out content from cable programmers 5 and 6, and, further, also multiplexes a retune feed 116 from cable programmer 4. Similarly, wide area multiplex #3 106 multiplexes the content from cable programmer 1-3 as well as the blacked out content from cable programmers 4 and 6, but, further, also multiplexes a retune feed 118 from cable programmer 5. Lastly, wide area multiplex #4 108 multiplexes the content from cable programmer 1-3 as well as the blacked out content from cable programmers 4 and 5, and, further, also multiplexes a retune feed 120 from cable programmer 6. The outputs from the multiplexes are combined in a combiner 110 to produce the aggregate WOI outbound traffic sent to each LOI. In one embodiment, dynamic bandwidth allocation may be applied for each wide area multiplex, but limited to the non-retune portion of each multiplex.

Continuing to refer to FIG. 1, at the LOI, the aggregate WOI outbound traffic, represented by a box labeled "combiner 110" in dotted lines corresponding to the aggregate WOI outbound traffic generated by combiner 110 in the WOI the is received by a decombiner and wanted WOI multiplex selection module 132 that drops the signals from the unneeded wide area (WOI) multiplexes sent to the LOI. A combiner 130 combines the signals from decombiner and wanted WOT multiplex selection module 132 and a local multiplex 134. Local multiplex 134 in turn combines the feeds received from a group of local programmers 136. In one embodiment, dynamic bandwidth allocation may be used for the feed received from group of local programmers 136. Combiner 130 then sends the received signals as an aggregate LOI outbound traffic signal.

In one embodiment, the program keys for the retune programming may not need to be different from the blacked out program, as long as the blacked out programming is not broadcast within the blacked out service area. However, someone wishing to circumvent the system may use a wideband Internet connection to access the broadcasted programming from another, non-blacked out service area. In this case, the keys may need to be different to prevent access to programming in the blacked out service area.

The approach illustrated by the system in FIG. 1 concentrates the hardware and software impact of retune into the WOI. The WOI has to be aware of each active retune and prepare an appropriate multiplex feed. The requirements with this approach are:

The WOI may have a complete set of compression and multiplex equipment for each occurrence of a feed. The same media gets compressed multiple times. Potentially, for example, the media includes one east non-retune feed, one west non-retune feed, plus at least one feed for each currently active instance of a blackout. This duplication may ultimately exceed the capacity of the distribution channel to carry all of the wide area sourced programming. Thus, the number of retune events that can occur at one time is dependent on the capacity of the distribution channel.

Satellite receivers currently available for cable head end applications retune according to their physical location—e.g., by ZIP code. The retune receivers in the WOI need to respond to all retunes, and identify the affected area to the WOI, so the appropriate LOI(s) can be notified and switch to the appropriate retune feed. (There has to be upper level intelligence above the receivers that controls which receiver supports a given retune feed.)

The dynamic allocation of bandwidth to non-single feed network (i.e., networks where there are multiple feeds for multiple time zones, etc.) material potentially interferes with multiple services in adjacent market areas. In one embodiment, the method should probably use fixed bandwidth allocation during blackouts.

The principal advantages of the approach illustrated in FIG. 1 are:

No per retune feed satellite receivers are required at the LOI. Thus, there is lower capital expense associated with this approach.

The single feed network model is supported across non-blacked out areas.

Figure 2:
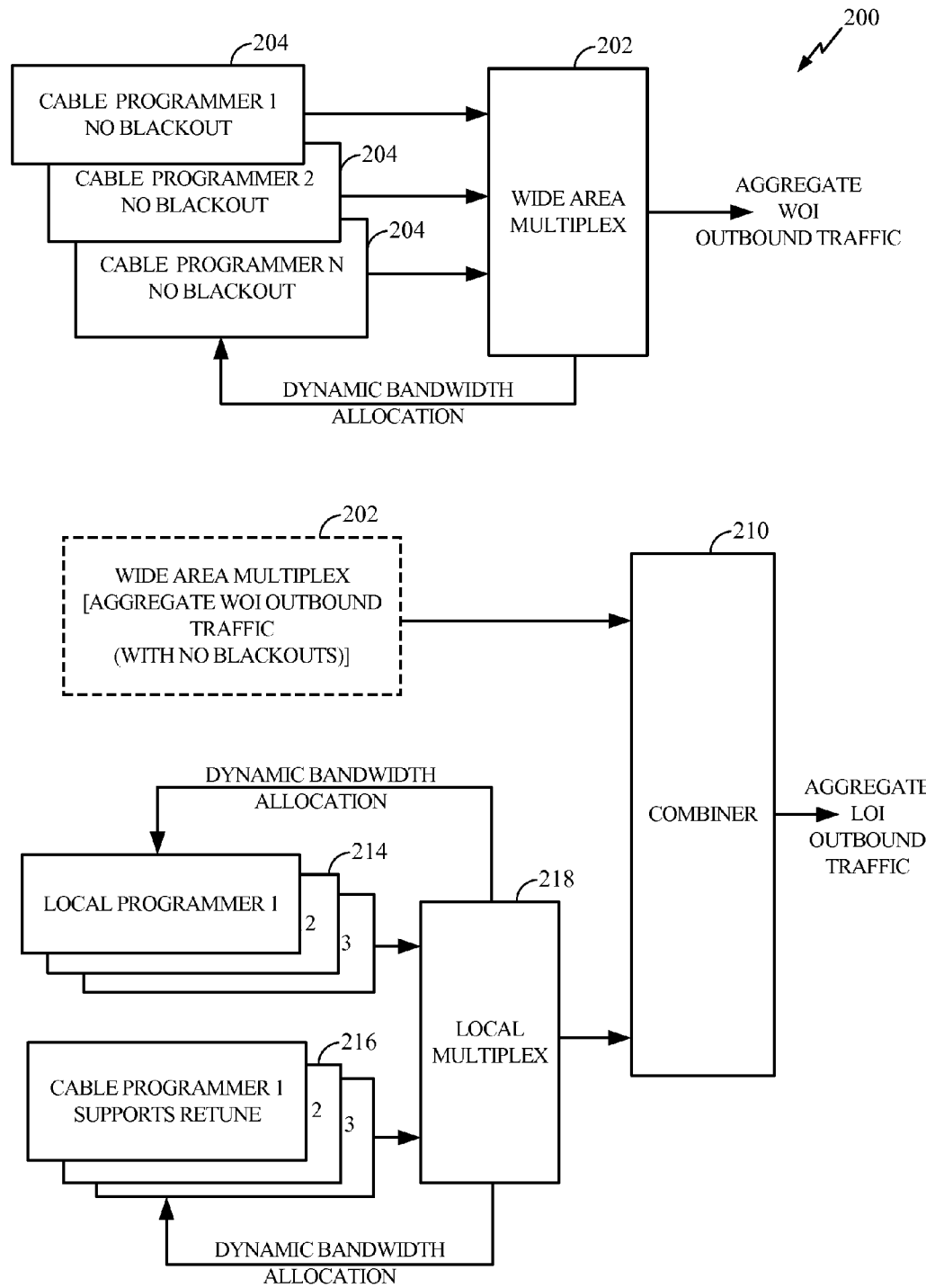
FIG. 2 is a diagram for a second apparatus for retune programming redistribution, wherein retune programming is directly distributed to the local area operation infrastructure (LOI)

FIG. 2 illustrates a system 200 for retune programming redistribution for direct distribution of programming subject to retune to the LOI, wherein retune programming from cable programmers that supports retune 1-3 216 is captured at the LOI and included in a combiner 210. The output from wide area multiplex 202 is a combination of non-blacked out feeds received from cable programmers 204. Combiner 210 also receives output from a wide area multiplex 202 and, through a local multiplex 218, programming from local programmers 1-3 214 and cable programmers that support retunes 1-3 216. In one embodiment, dynamic bandwidth allocation may be used for the non-blacked out feeds. In addition, dynamic bandwidth allocation may also be used for the feeds received from local programmers 1-3 214 and/or the retune programming received from cable programmers 1-3 216.

In system 200, the existing retune satellite receivers function in exactly the same manner as in a cable headend. The satellite receiver automatically retunes from the blacked out feed to the retune feed at an appropriate time based on its location. This approach concentrates the impact of retune in the LOI. The WOI has no knowledge of the presence of a blackout on any given feed. The primary requirements with this approach are:

A "wide area" service may be identified as retune or non-retune. If a "wide area" feed is identified as retune capable, it is only carried in the local multiplexes. There is no SFN support for channels that support retune at all. The coverage of the wide area ads is reduced for services that utilize retune at all times.

Every satellite feed with retune requires a satellite receiver at each LOI to receive the retune programming, rather than one each at the WOI. Additional satellite antennas are also required at the LOI, because it is doubtful that the cable programmers and the outbound WOI feed will share a satellite.

The advantages of this approach are:

It is relatively simple to implement.

The retune programming enjoys the benefits of dynamic bandwidth allocation within the local multiplex.

Figure 3:
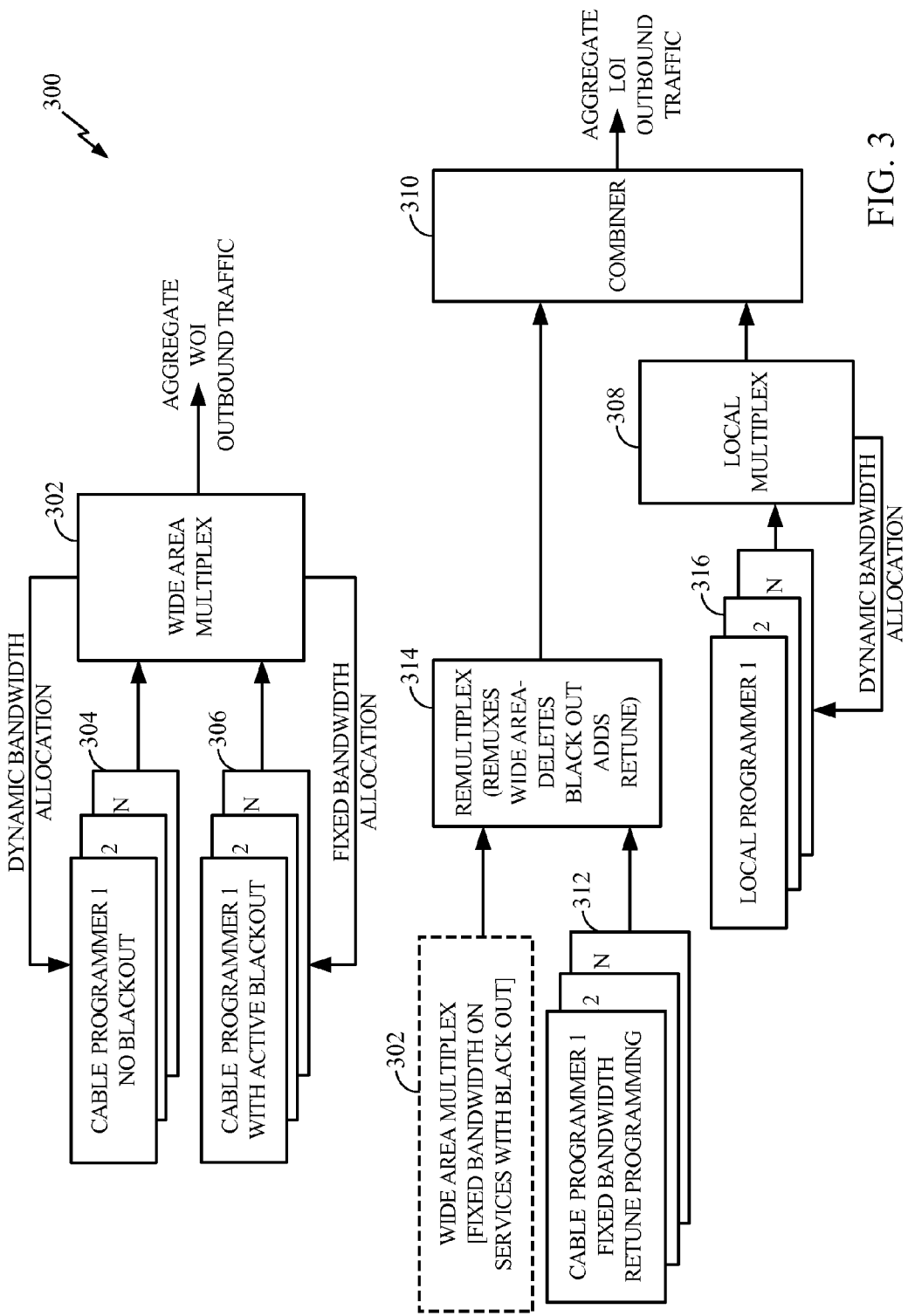
FIG. 3 is a diagram for a third apparatus for retune programming redistribution for hybrid retune programming distribution.

FIG. 3 illustrates a system 300 for redistribution of retune programming that uses a hybrid LOI/WOI retune programming distribution scheme, wherein the WOI captures and inserts programming in the wide area multiplex(s) whether the programming is subject to blackouts or not. Thus, as illustrated, the feed from cable programmer 1-N 304 is provided with dynamic bandwidth allocation by a wide area multiplex 302, while the blacked out feed from cable programmer 1-N 306 is provided with fixed bandwidth allocation. Thus, in one embodiment, the use of dynamic bandwidth allocation on a given service is only enabled for services that do not have an active blackout. When a blackout occurs the affected service is switched to a fixed allocation of bandwidth.

A combiner 310 receives a re-multiplexed feed from (1) a re-multiplex 314 that combines the feed from wide area multiplex 302 with the retuned programming from cable programmers 1-N 312, wherein the retune programming has fixed bandwidth; and, (2) programming from local programmers 1-N 316 through a local multiplex 308. Re-multiplex 314 deletes the blacked out programming from wide area multiplex 302 and adds the fixed bandwidth retune programming. Thus, the LOI captures retune programming and replaces the fixed bandwidth allocation of the service under blackout with the locally captured and compressed retune feed. It should be noted that because the service under blackout is being deleted and thus not ultimately broadcast to the LOI, this affects the benefits provided by the SFN as each LOI that is adjacent to this LOI will be affected by the interference caused by this LOI not broadcasting the same signal. This issue is encountered every time an LOI broadcasts a different signal than adjacent LOI(s).

The approach of system 300 of FIG. 3 splits the effort between the WOI and the LOI. The principal requirements with this approach are:

The WOI has to have a mechanism to determine when a retune is pending. The messages are known to exist in the current cable head end equipment. Access to those messages may be an issue.

The LOI has to have a mechanism to determine when a retune is pending. The messages are known to exist in the current cable equipment. Access to those messages may be an issue.

The effectiveness of dynamic bandwidth allocation is reduced, for the WOI sourced feeds due to the static bandwidth allocation of channels currently subject to retune.

Each LOI must have a satellite receiver per channel that can have retune.

The primary advantages of this system are:

The number of multiplexes from the WOI stays constant.

The SFN feature for the non-blacked out areas is supported.

Figure 4:
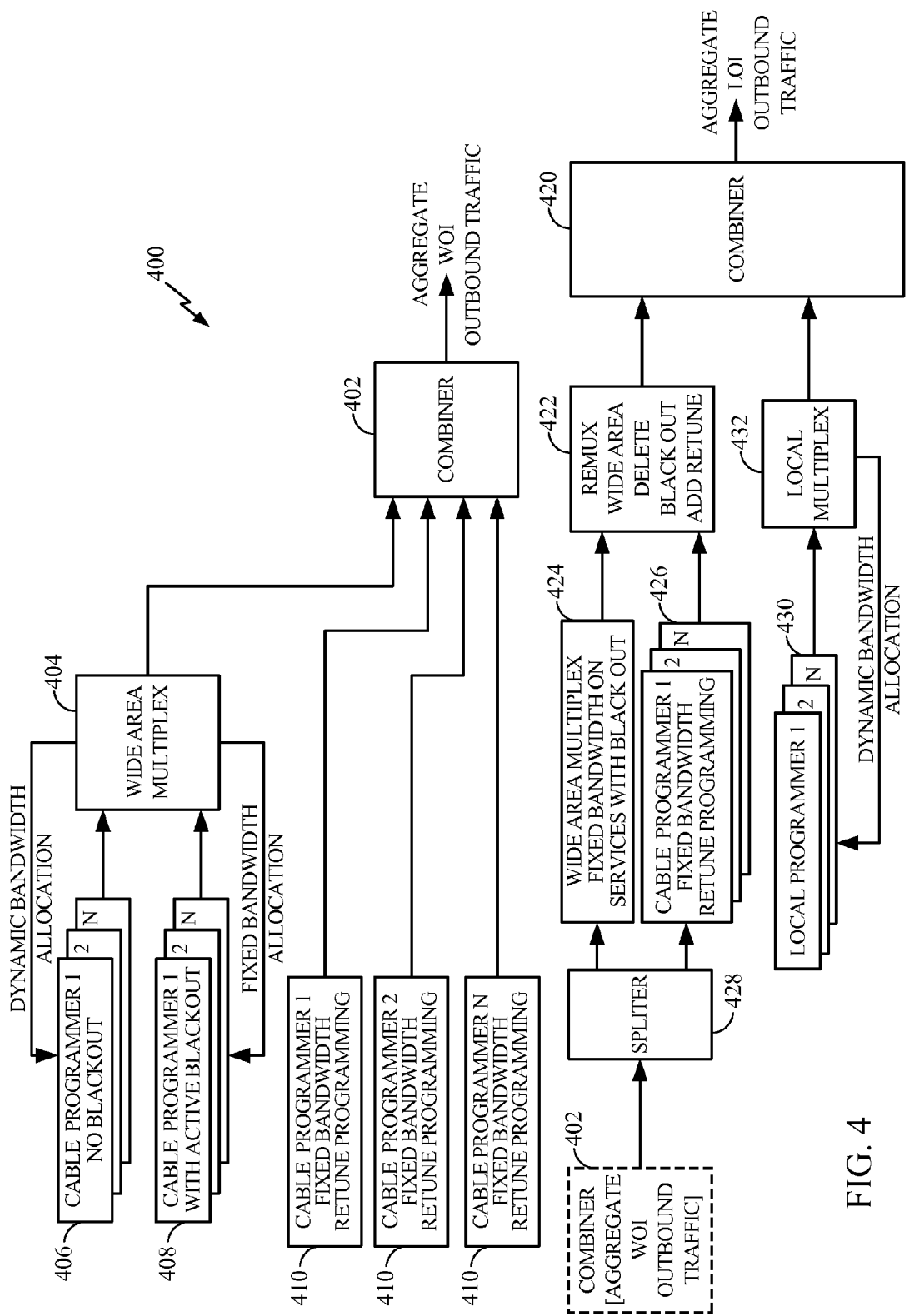
FIG. 4 is a diagram for a fourth apparatus for retune programming redistribution, wherein a redistribution is originated from a fixed multiplex WOI

FIG. 4 illustrates a system 400 for redistribution of retune programming where there are fixed multiplex WOI originated redistribution of retune programming. A wide area multiplex 404 receives programming from cable programmer 1-N 406 that may include dynamic bandwidth allocation in one embodiment, and cable programmer with active black out I-N 408 with fixed bandwidth allocation. In one embodiment, dynamic bandwidth allocation is used for the programming received from cable programmer 1-N 406 and fixed bandwidth allocation for the programming received from cable programmer with active black out 1-N 408. A combiner 402 combines the feed from wide area multiplex 404 with fixed bandwidth retune programming from cable programmer 1-N 410. Thus, the WOI captures the replacement feeds and compresses them as a fixed bandwidth services. The WOI transmits the wide area feeds as before, but the services with a blackout are fixed bandwidth services. The retune programming is distributed to the LOI(s) along with the wide area feeds.

A splitter 428 at the LOI splits the feed received from wide area multiplex 404 into fixed bandwidth feeds from services with black out 424 and fixed bandwidth feeds of retune programming 426. A re-multiplex 422 deletes the blacked out feed and adds the retune feed. A combiner 420 receives the feeds from re-multiplex 422 as well as local programmer 1-N 430 through a local multiplex 432. Thus, in system 400, the LOI replaces the blacked out programming with the designated retune service.

Similar to system 100, the approach of system 400 concentrates most of the hardware and software impact of retune into the WOI. The WOI has to be aware of each active retune and prepare an appropriate feed. The requirements with this approach are:

The WOI must have an additional set of compression equipment for each service capable of retune programming The satellite receivers currently available for cable head end applications retune according to their geographical location. The retune receivers needed for the WOI need to respond to all retunes, and identify the effected area to the WOI, so the appropriate service areas can be notified and switch to the retune feed.

There is some loss of efficiency within the wide area multiplex, when a retune event is occurring.

The principal advantages of this method are:

The capital expense for the system is minimized.

The SFN feature is maintained for wide area services that support blackout and retune.

It is probable that all the outbound WOI traffic to the LOI(s) can still fit in one transponder.

It is possible to completely avoid all time stamp correction in the LOI, since the various encoders in the WOI can communicate with each other.

Figure 5:
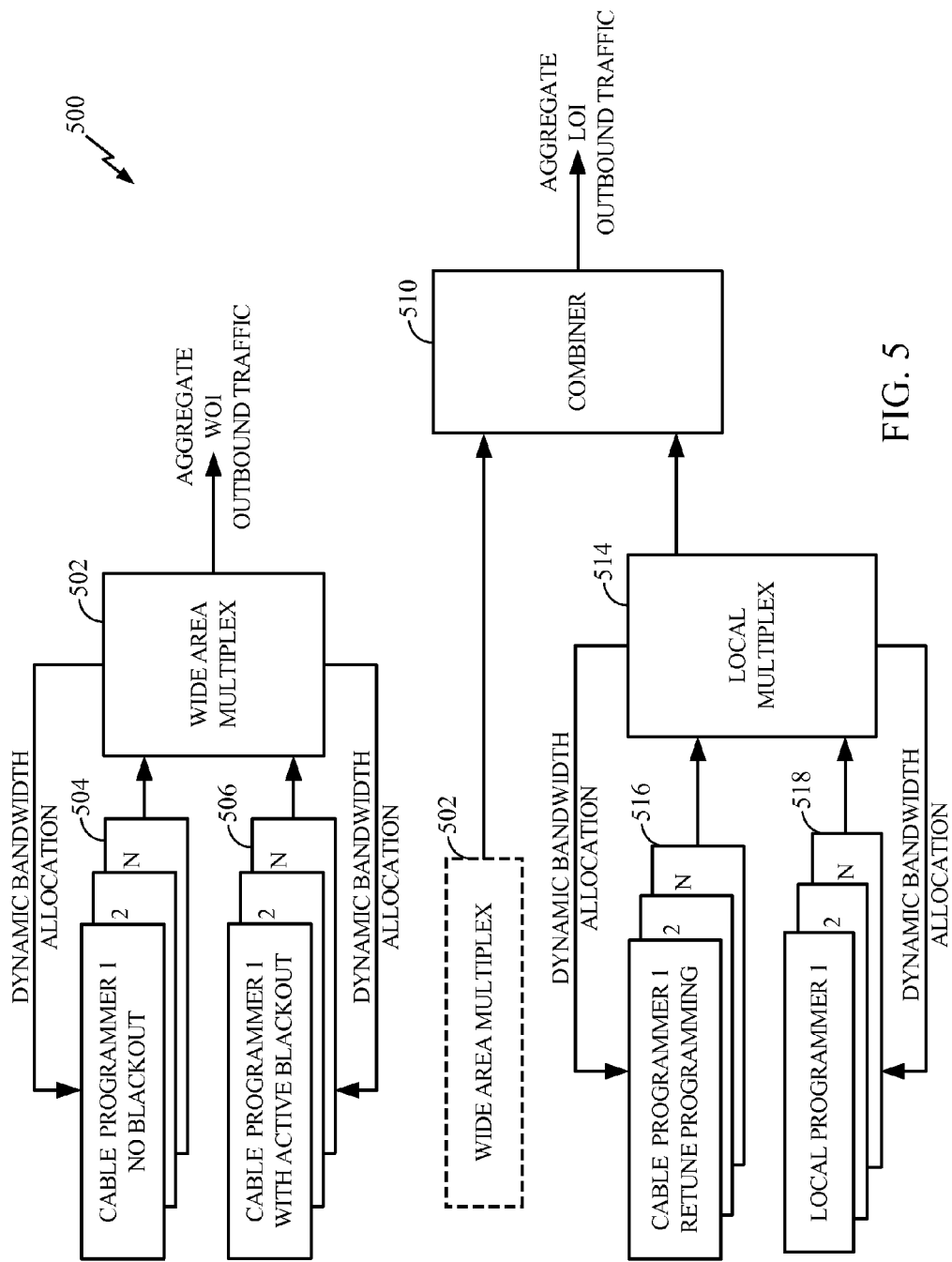
FIG. 5 is a diagram for a fifth apparatus for retune programming redistribution, wherein the retune programming distribution is performed with a dual carriage distribution configuration including a client retune.

FIG. 5 illustrates a system 500 for redistribution of retune programming using a dual carriage architecture (i.e., system 500 carries both the services with black out and retune) with client retune. A wide area multiplex 502 receives feeds from cable programmers 1-N 504 and aggregates it with feeds from cable programmers with active blackout 1-N 506. Thus, in this embodiment, the blacked out programming is carried in the wide area feed at all times, and all areas.

A local multiplex 514 receives retune programming from cable programmer 1-N 516 and feeds from local programmer 1-N 518, both with dynamic bandwidth allocation. Thus, in one embodiment, the retune programming is carried in the local feed, when a blackout is active for the service area of a specific LOI. A combiner 510 receives and multiplexes the feed from wide area multiplex 512 and local multiplex 514. The client is instructed to tune to the retune programming, when it is active in the LOI's specific service area.

This approach concentrates most of the hardware and software impact of retune into the LOI and the client. The LOI has to be aware of each active retune and insert it into local multiplex 514. The LOI has to notify the client, when to retune to the alternate programming. The requirements with this approach are:

Each LOI has to have a satellite receiver for each service that can have retune.

The LOI has to determine the presence of retune and allocate bandwidth for the feed.

The retune programming consumes some of the local channel bandwidth.

Digital rights management has to be modified to force the client to switch to the retune feed.

The advantages of this approach are:

The insertion of the retune media does not interfere with the wide area feed.

The wide area and local feeds can maintain the use of dynamic bandwidth allocation for all services.

The wide area feed maintain SFN functionality even during blackouts. Adjacent blacked out areas do not interfere with the wide area feed.

Figure 6:
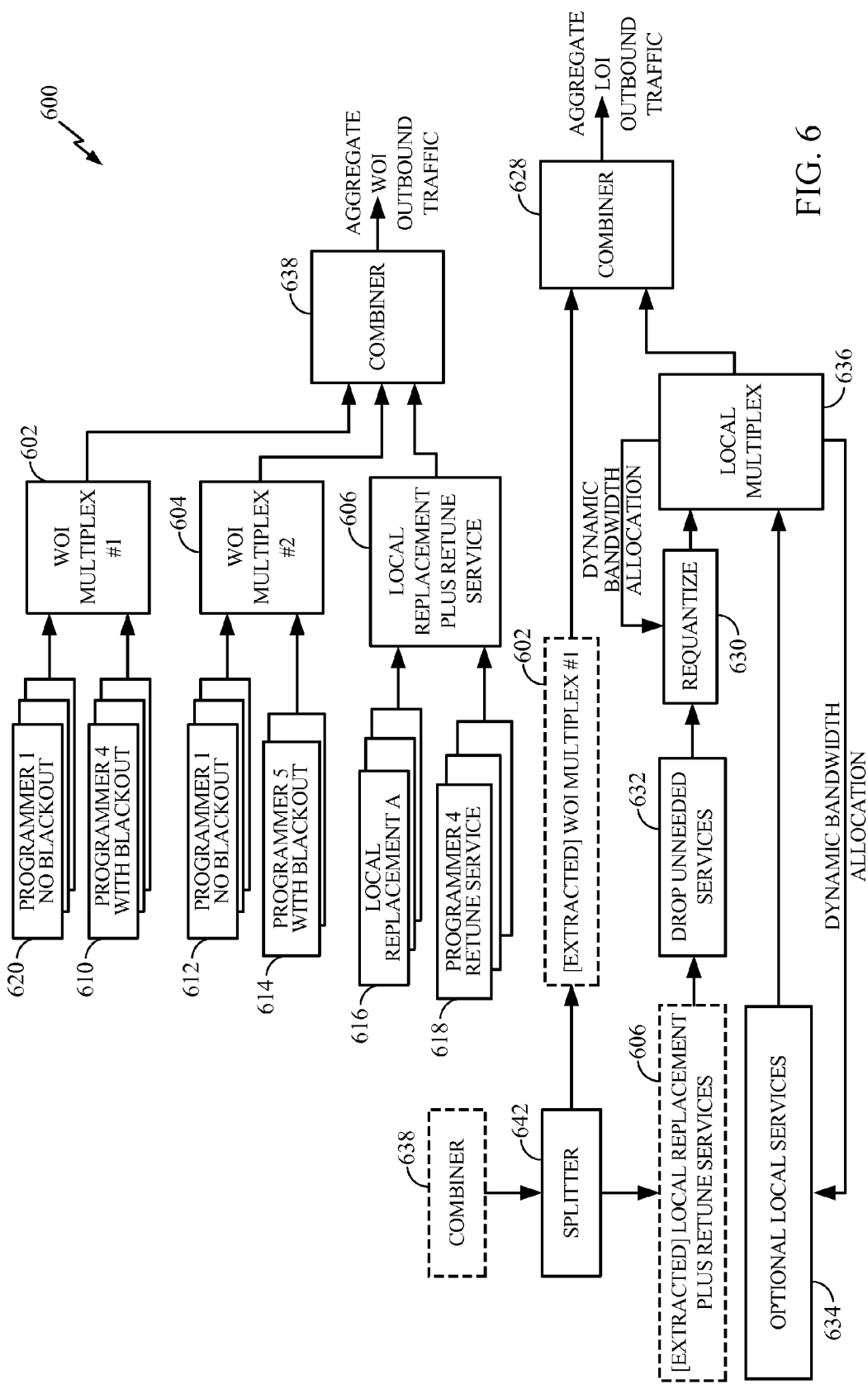
FIG. 6 is a diagram for a sixth apparatus for retune programming redistribution, wherein the retune programming redistribution is from the WOI but includes a local replacement multiplex with retune.

A system 600 for redistribution of retune programming that adds a local replacement with retune multiplex 606 is shown in FIG. 6. System 600 is similar to system 100 of FIG. 1 in that the retune programming is captured at the WOI, and distributed to the LOI(s). Specifically, a plurality of WOI multiplexes as exemplified by a WOI multiplex #1 602 and a WOI multiplex #2 604 creates multiplexed feeds that are sent to a combiner 620. The multiplexed feeds are created from non-blacked out feeds 608 and 612 and blacked out feeds 610 and 614. The replacement programming is multiplexed onto a local replacement/retune feed by a wide area combiner 638, which is similar to a wide area feed, but contains the replacement programming. This adds one full multiplex to the outbound traffic of the WOI. In this embodiment, the per program keys for the retune programming may not need to be different from the blacked out program as long as the blacked out programming is not broadcast within the blacked out service area. A wideband Internet connection might allow access to the material, in which case the keys may need to be different.

This approach concentrates the hardware and software impact of retune into the WOI. In addition, the WOI has to be aware of each active retune and incorporate the all retune feeds into the local replacement/retune feed. However, even though the effort for implementing the system impacts the WOI more than the LOI, the software effort in the LOI is increased as the local replacement/retune feed for transmission in the LOI (created by local replacement with retune multiplex 606 at the WOI) must be extracted and requantized at the LOI. For example, continuing to refer to FIG. 6, in one embodiment, a combiner 628 at the LOI receives a requantized feed from a requantize module 630, the requantized feed being generated by dropping unneeded services 632. In one embodiment, combiner 628 receives the requantized feed from a local multiplex 636, which also receives optional local services 634 and multiplexes any optional local services with the requantized feed before providing it to combiner 628. In the example illustrated in FIG. 6, where the LOI is supposed to receive the feed from WOI multiplex #1 602, combiner 628 creates the aggregate LOI outbound traffic from what it receives from local multiplex 636 and the feed from WOI multiplex #1 602 that is extracted from the aggregate WOI outbound traffic provided by combiner 608. In one embodiment, dynamic bandwidth allocation may be used for the requantized feed and/or the optional local service feeds.

System 600 provides bounded bitrate output, and limits the number of total multiplexes to the number of WOI's+1. The requirements for this approach include:

The WOI must have a complete set of compression and multiplex equipment for each occurrence of a retune feed.

The LOI must demultiplex and re-quantize the Local Replacement/Retune feed at each LOI, where retune is active, or any of the replacement programming is being distributed.

The WOI has to have a high level knowledge of active blackouts and retunes, and make sure that the appropriate content is available in each retune feed. This functionality can be automated, but can operate in a partially manual mode.

The local programming shares bandwidth with the retune programming, when retune is active. There may be some degradation of local programming quality during the retune.

The advantages provided by system 600 include:

No per retune feed satellite receivers are required at the LOI. (Lowers capital expense.)

The LOI feed is able to maintain the benefits of statistical multiplexing during retune.

Local Replacement programming is supported in markets that cannot justify the expense of locally sourced content.

SFN is supported across the non-blacked out areas.

Six embodiment of blackout and retune systems have been presented to support blackout and retune within a wireless content system architecture. Option 1: central redistribution of retune programming, as shown in system 100 of FIG. 1, makes the number of multiplexes outbound from the WOI potentially unconstrained and is complex to implement. Option 2: direct distribution of retune programming to the LOI, as shown in system 200 of FIG. 2, is simple to implement, but has high capital expense in the LOI. Also, the associated loss of SFN support may be unacceptable to retune programmers. Option 3: hybrid LOI/WOI approach, as shown in system 300 of FIG. 3, retains SFN where possible, but has the high capital expense in the LOI, and is more complex to implement. Option 4: fixed multiplex redistribution from the WOI, as shown in system 400 of FIG. 4, minimizes capital expenditures, and retains the SFN feature, at the cost of some efficiency. Option 5: Dual carriage with client retune, as shown in system 500 of FIG. 5, maintains dynamic bandwidth allocation on both feeds and support SFN, at the cost of bandwidth or quality for the local services. Option 6: WOI redistribution including local replacement & retune with requantization, as shown in system 600 of FIG. 6, which adds a local replacement multiplex with retune and includes a bounded bitrate, limits the number of total multiplexes to the number of WOI's+1, but adds requantize complexity in the LOI Table 1 below provides a summary of the 5 described embodiments.

TABLE 1

System Comparison

| System | Attribute | | | | | |
|---|---|---|---|---|---|---|
| | Supports Wide Area Single Frequency Network | Maximizes Benefits of Dynamic Bandwidth Allocation | Capital Expense | Development Expense | Variation in WOI out bound data rate | Retune Event Impacts Local Bandwidth Allocation |
| Option 1: WOI Redistribution | Yes* | Yes* | Moderate | High | High >>2:1 | No |
| Option 2: Direct to LOT | No | Yes | High | Low | None | No |
| Option 3: Hybrid LOI/WOI | Yes | No | High | Moderate | None | No |
| Option 4: WOI Redistribution Fixed Bandwidth | Yes | No | Lowest | High | Low <<2:1 | No |
| Option 5: Dual Carriage with Client Retune | Yes | Yes | High | Low | None | Yes |
| Option 6: WOI Redistribution Local Replacement & Retune With Requantization | Yes | Yes | Moderate | Moderate | None | Moderate |

*Not possible concurrently.

Given the described embodiments, one possible approach that may be taken to implement a system in accordance with one embodiment is to begin with a system that utilizes direct distribution and transition to a system that has fixed multiplex redistribution at a later date, if phasing in SFN support for retune channels is acceptable to the impacted programmers. To some extent, the loss of wide area SFN is less important if service may be started up in disjoint service areas.

Figure 7:
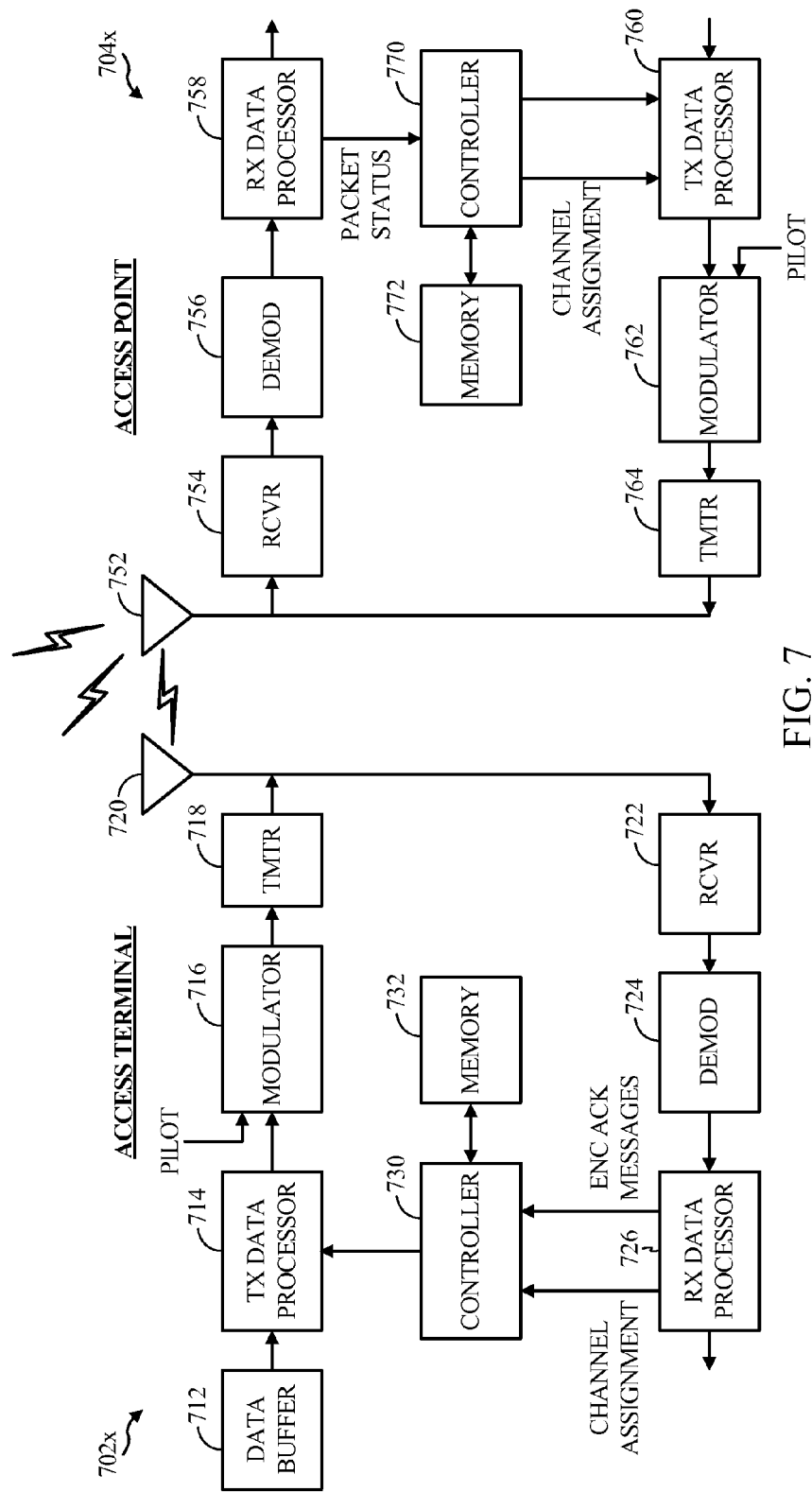
FIG. 7 is a block diagram of an access point and an access terminal usable to provide communication between a transmitter and a receiver, respectively; and, FIG. 8-13 are flow diagrams illustrating the operation of the various embodiments of the apparatus for retune programming redistribution.

FIG. 7 shows a block diagram of an access point 704x that may be used to transmit the signals in an LOI, and an access terminal 702x that may be used to receive the transmitted signals. In one embodiment, client devices do not need capability for transmitting information back to the network as they are, in essence, only programming receivers. Thus, no return paths from clients (also referred to as reverse links) are required and the clients do not need to implement the described modules or units necessary for transmission functionality. Accordingly, the access points in this embodiment do not need to implement the modules or units necessary for reception functionality. In another embodiment, the system may allow two-way communication between access points and clients, and thus the access points and clients will implement necessary units or modules for receipt and transmission, respectively. Of course, in the latter embodiment, a heterogeneous system may be implemented where clients that are designed to transmit data co-exist with clients that are designed only to be receivers.

For the reverse link, at access terminal 702x, a transmit (TX) data processor 714 receives traffic data from a data buffer 712, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 716 receives the data symbols, pilot symbols, and possibly signaling for the reverse link, performs (e.g., OFDM) modulation and/or other processing as specified by the system, and provides a stream of output chips. A transmitter unit (TMTR) 718 processes (e.g., converts to analog, filters, amplifies, and frequency upconverts) the output chip stream and generates a modulated signal, which is transmitted from an antenna 720.

At access point 704x, the modulated signals transmitted by access terminal 702x and other terminals in communication with access point 704x are received by an antenna 752. A receiver unit (RCVR) 754 processes (e.g., conditions and digitizes) the received signal from antenna 752 and provides received samples. A demodulator (Demod) 756 processes (e.g., demodulates and detects) the received samples and provides detected data symbols, which are noisy estimate of the data symbols transmitted by the terminals to access point 704x. A receive (RX) data processor 758 processes (e.g., symbol demaps, deinterleaves, and decodes) the detected data symbols for each terminal and provides decoded data for that terminal.

For the forward link, at access point 704x, traffic data is processed by a TX data processor 760 to generate data symbols. A modulator 762 receives the data symbols, pilot symbols, and signaling for the forward link, performs (e.g., OFDM) modulation and/or other pertinent processing, and provides an output chip stream, which is further conditioned by a transmitter unit 764 and transmitted from antenna 752. The forward link signaling may include power control commands generated by a controller 770 for all terminals transmitting on the reverse link to access point 704x. At access terminal 702x, the modulated signal transmitted by access point 704x is received by antenna 720, conditioned and digitized by a receiver unit 722, and processed by a demodulator 724 to obtain detected data symbols. An RX data processor 726 processes the detected data symbols and provides decoded data for the terminal and the forward link signaling. Controller 730 receives the power control commands, and controls data transmission and transmit power on the reverse link to access point 704x. Controllers 730 and 770 direct the operation of access terminal 702x and access point 704x, respectively. Memory units 732 and 772 store program codes and data used by controllers 730 and 770, respectively.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may include an IP network, by converting received air-interface frames to IP packets. Access point also coordinates the management of attributes for the air interface.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Figure 8:
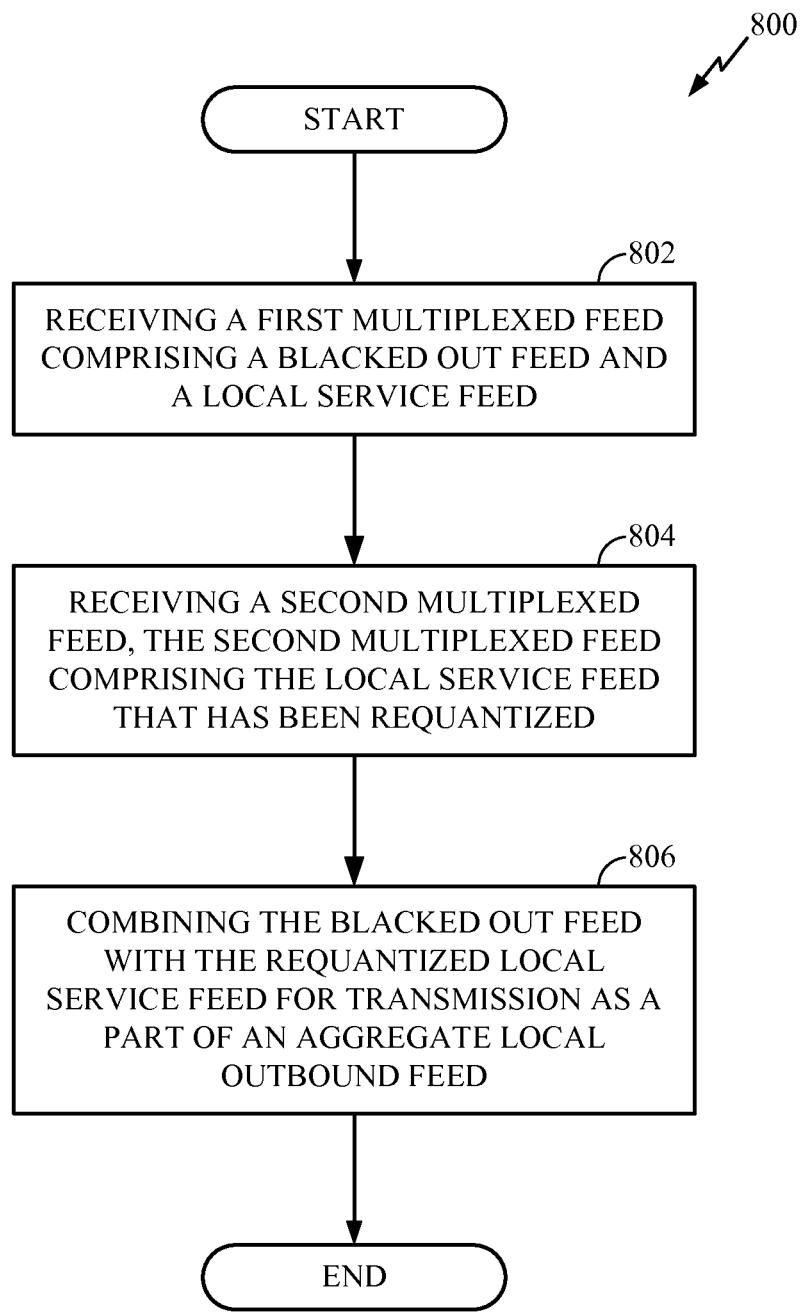

FIG. 8 illustrates a method 800 for blackout and retune distribution implemented by the system of FIG. 6, including step 802, with the LOI receiving a first multiplexed feed comprising a blacked out feed and a local service feed; step 804, with the LOI receiving a second multiplexed feed, the second multiplexed feed comprising the local service feed that has been requantized; and, step 806, with the LOI combining the blacked out feed with the requantized local service feed for transmission as a part of an aggregate local outbound feed.

Figure 9:
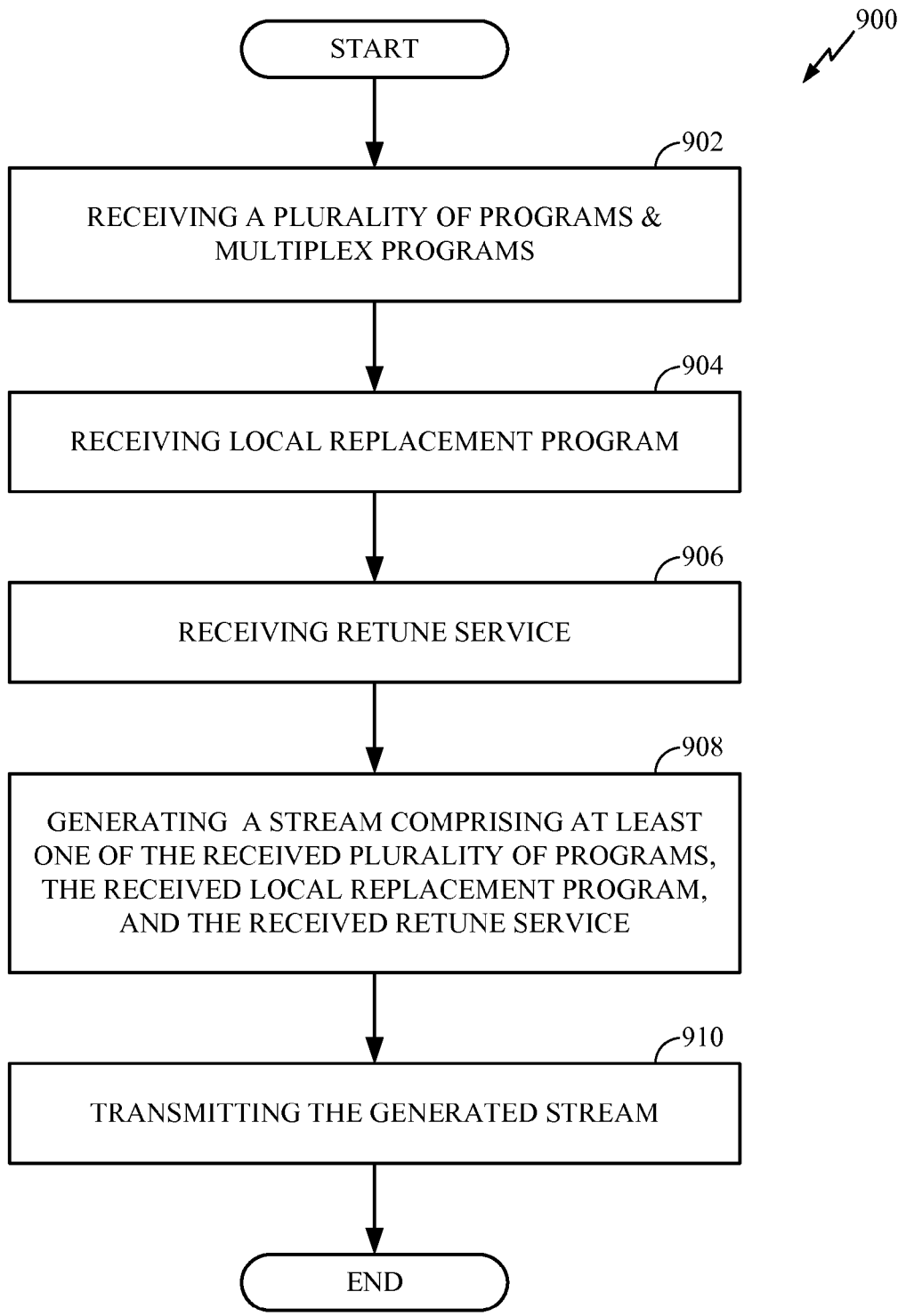

FIG. 9 illustrates a method 900 for blackout and retune distribution implemented by the system of FIG. 6, including step 902, with the LOI receiving a local replacement program; step 904, receiving a retune service; and step 906 generating a stream comprising at least one of the received plurality of programs, the received local replacement program, and the received retune service.

Figure 10:
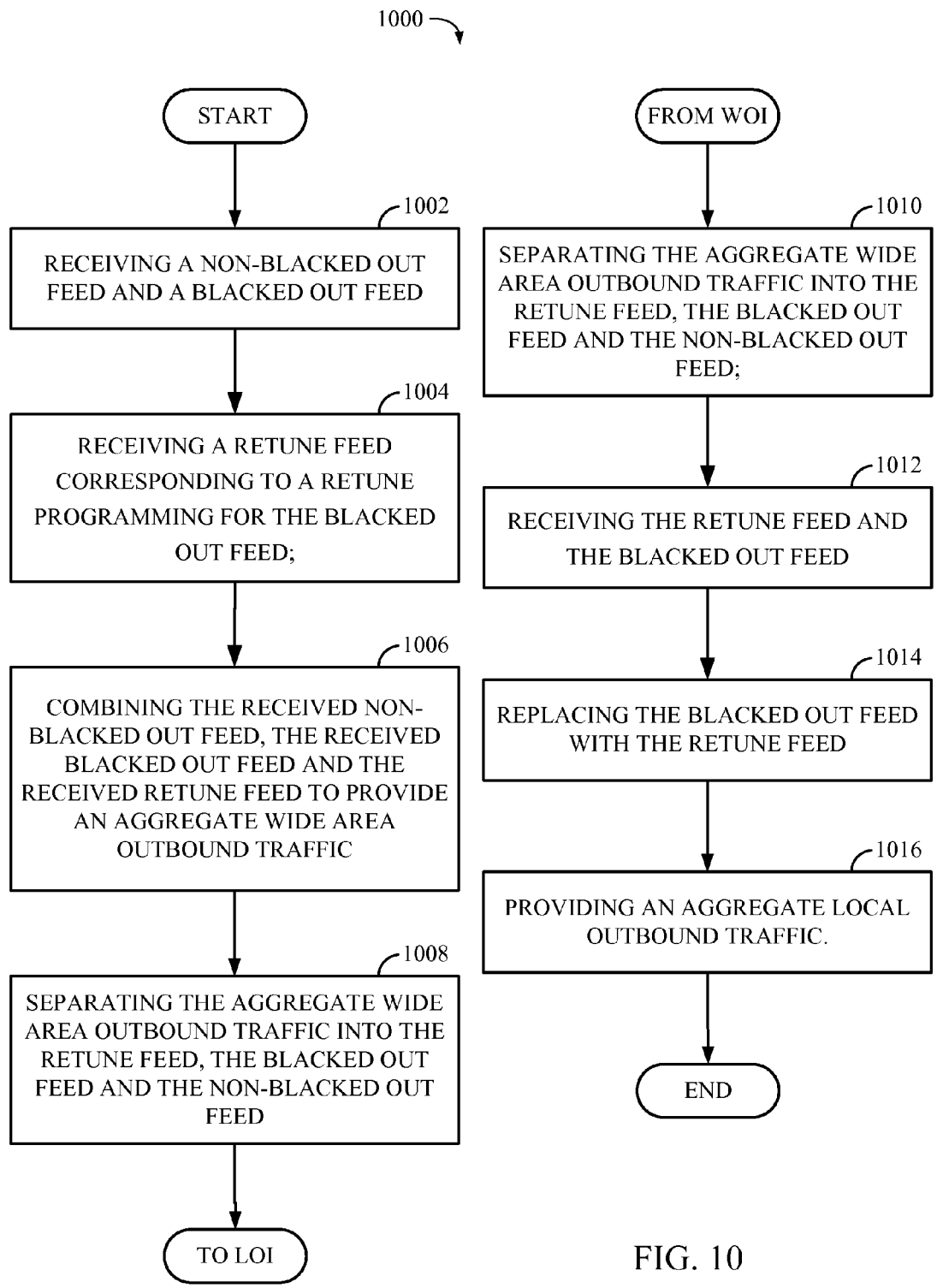

FIG. 10 illustrates a method 1000 for blackout and retune distribution implemented by the system of FIG. 1, including where the WOI, in step 1002, receiving a non-blacked out feed and a blacked out feed; step 1004, receiving a retune feed corresponding to a retune programming for the blacked out feed; and step 1006, combining the received non-blacked out feed, the received blacked out feed and the received retune feed to provide an aggregate wide area outbound traffic. Further, the method includes step 1008, separating the aggregate wide area outbound traffic into the retune feed, the blacked out feed and the non-blacked out feed; step 1010, receiving the retune feed and the blacked out feed; step 1012, replacing the blacked out feed with the retune feed; and step 1014, providing an aggregate local outbound traffic.

Figure 11:
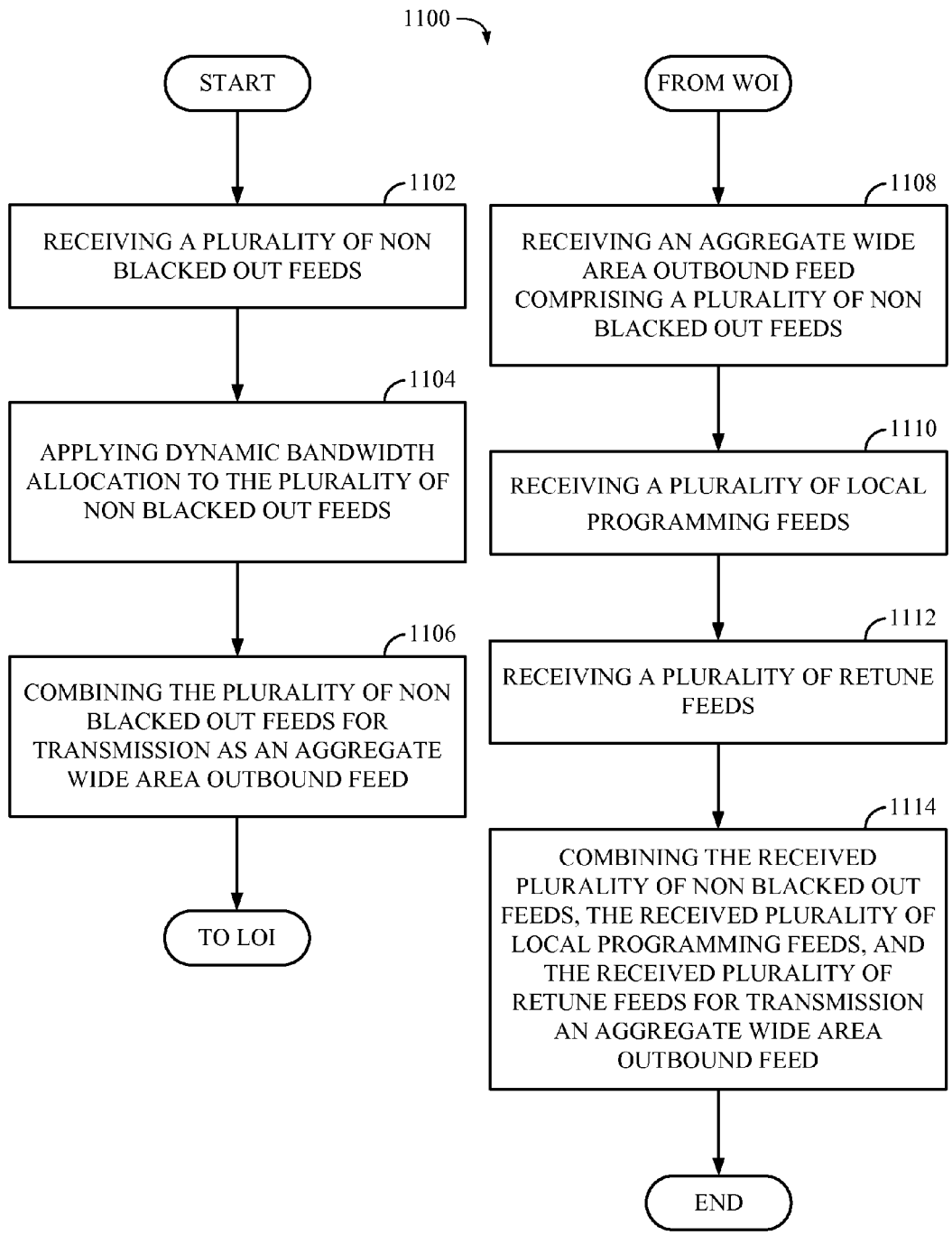
Figure 12:
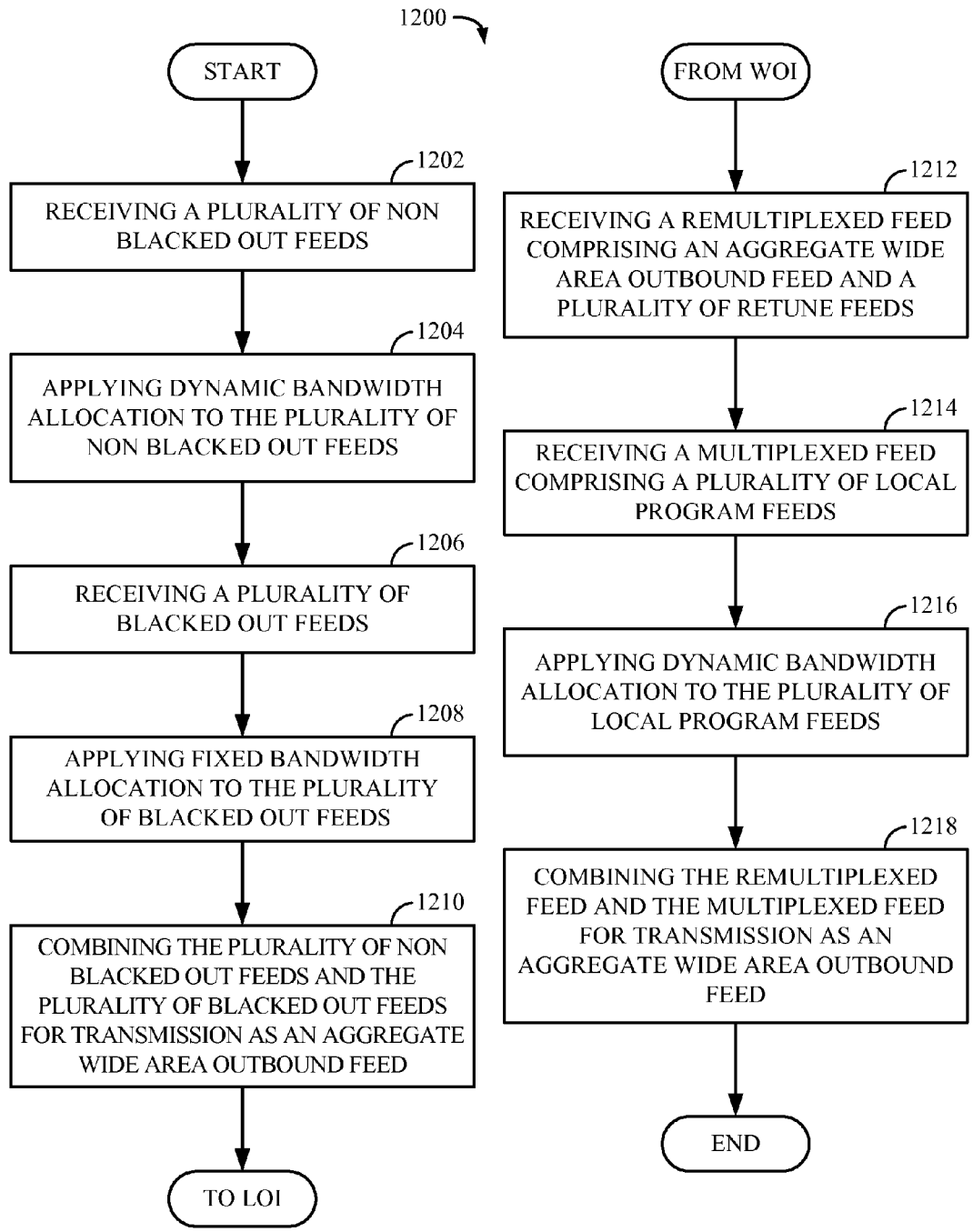

FIG. 11 illustrates a method 1100 for blackout and retune distribution implemented by the system of FIG. 2, with wide area multiplex 202, at the WOI, step 1102, receiving a plurality of non blacked out feeds; step 1104, applying dynamic bandwidth allocation to the plurality of non blacked out feeds; and, step 1106, combining the plurality of non blacked out feeds for transmission as an aggregate wide area outbound feed. Further, in the LOI, step 1108, receiving an aggregate wide area outbound feed comprising a plurality of non blacked out feeds; step 1110, receiving a plurality of local programming feeds; step 1112, receiving a plurality of retune feeds; and, step 1114, combining the received aggregate wide area outbound feed, the received plurality of local programming feeds, and the received plurality of retune feeds for transmission an aggregate local area outbound feed FIG. 12 illustrates a method 1200 for blackout and retune distribution implemented by the system of FIG. 3, with wide area multiplex 302, at the WOI, step 1202, receiving a plurality of non blacked out feeds; step 1204, applying dynamic bandwidth allocation to the plurality of non blacked out feeds; step 1206, receiving a plurality of blacked out feeds; step 1208, applying fixed bandwidth allocation to the plurality of non blacked out feeds; and, step 1210, combining the plurality of non blacked out feeds and the plurality of blacked out feeds for transmission as an aggregate wide area outbound feed. Further, the LOI, in step 1202, receiving a remultiplexed feed comprising an aggregate wide area outbound feed and a plurality of retune feeds; step 1204, receiving a multiplexed feed comprising a plurality of local program feeds; step 1216, applying dynamic bandwidth allocation to the plurality of local program feeds; and, step 1218 combining the remultiplexed feed and the multiplexed feed for transmission as an aggregate wide area outbound feed.

Figure 13:
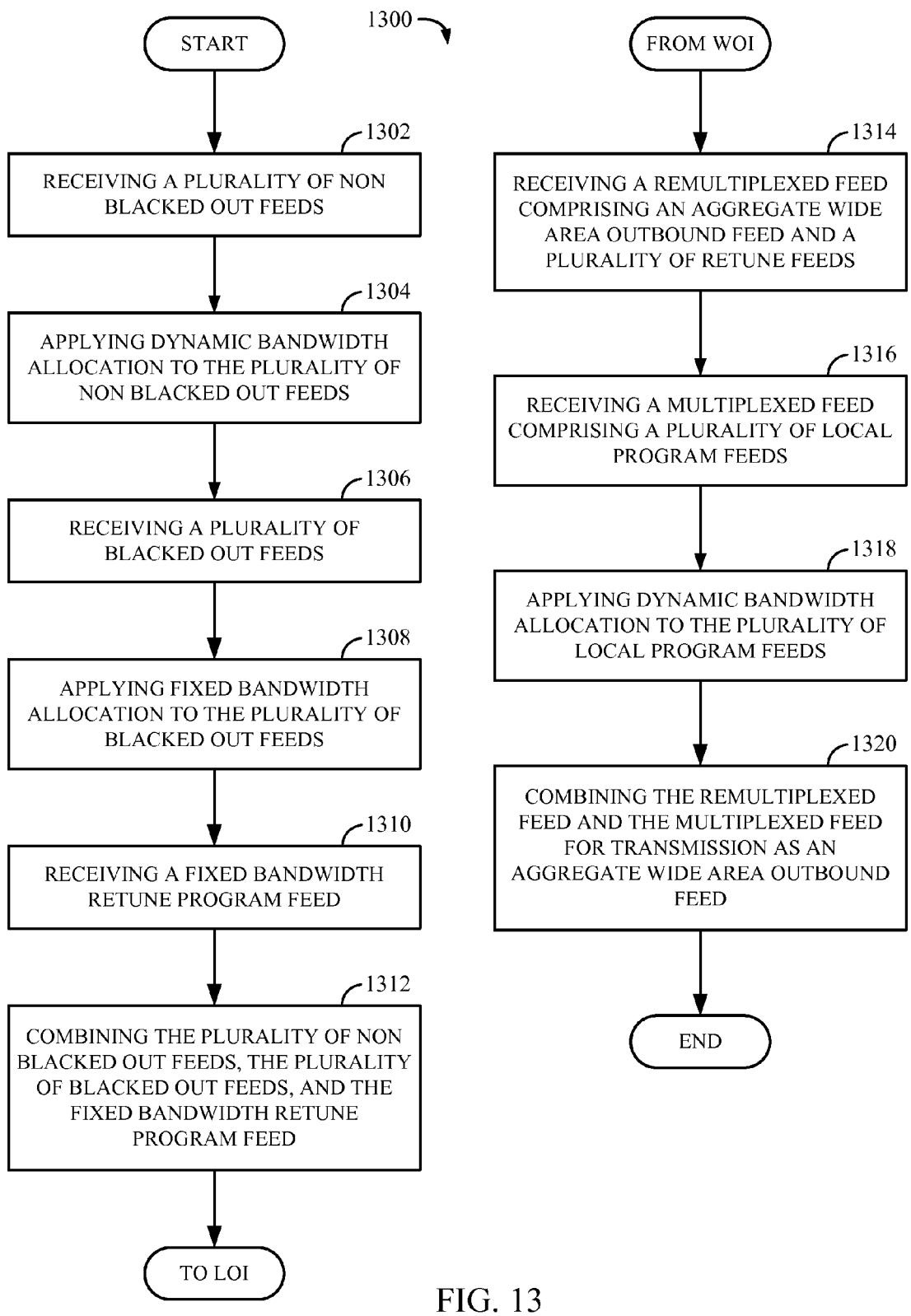

FIG. 13 illustrates a method 1300 for blackout and retune distribution implemented by the system of FIG. 4, with wide area multiplex 302, at the WOI, step 1302, receiving a plurality of non blacked out feeds; 1304, applying dynamic bandwidth allocation to the plurality of non blacked out feeds; step 1306, receiving a plurality of blacked out feeds; step 1308, applying fixed bandwidth allocation to the plurality of non blacked out feeds; step 1310, receiving a fixed bandwidth retune program feed; and, step 1312, combining the plurality of non blacked out feeds, the plurality of blacked out feeds, and the fixed bandwidth retune program feed. Further, the LOI, in step 1314, receiving a remultiplexed feed comprising an aggregate wide area outbound feed and a plurality of retune feeds; step 1316, receiving a multiplexed feed comprising a plurality of local program feeds; step 1318, applying dynamic bandwidth allocation to the plurality of local program feeds; and, step 1320, combining the remultiplexed feed and the multiplexed feed for transmission as an aggregate wide area outbound feed.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the description is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

A method for blackout and retune distribution including receiving a first wide area multiplexed feed, the first wide area multiplexed feed including a blacked out feed; and generating a requantized local service feed from a local replacement plus retune service feed, the local replacement plus retune service feed having a retune feed corresponding to a retune programming for the blacked out feed, wherein the requantized local service feed is to be combined with the first wide area multiplexed feed for transmission as a part of an aggregate local outbound traffic.

A blackout and retune distribution apparatus including means for receiving a first wide area multiplexed feed, the first wide area multiplexed feed including a blacked out feed; and means for generating a requantized local service feed from a local replacement plus retune service feed, the local replacement plus retune service feed having a retune feed corresponding to a retune programming for the blacked out feed, wherein the requantized local service feed is to be combined with the first wide area multiplexed feed for transmission as a part of an aggregate local outbound traffic.

An apparatus for blackout and retune distribution including a requantizer coupled to a wide area combiner to receive a retune feed from the wide area combiner, the requantizer generating a requantized local service feed from the local replacement feed and the retune feed; and, a local combiner coupled to the requantizer and the wide area combiner, the local combiner receiving the requantized local service feed and a blacked out feed from the wide area combiner, wherein the local combiner provides an aggregate local outbound traffic including the blacked out feed and the requantized local service feed.

A computer-readable medium having instructions stored thereon, the stored instructions, when executed by a processor, cause the processor to perform a method for blackout and retune distribution, the method including receiving a first wide area multiplexed feed, the first wide area multiplexed feed including a blacked out feed; and generating a requantized local service feed from a local replacement plus retune service feed, the local replacement plus retune service feed having a retune feed corresponding to a retune programming for the blacked out feed, wherein the requantized local service feed is to be combined with the first wide area multiplexed feed for transmission as a part of an aggregate local outbound traffic.

The embodiments described above are exemplary embodiments. Those skilled in the art may now make numerous uses of, and departures from, the above-described embodiments without departing from the inventive concepts disclosed herein. Accordingly, the description is to be defined solely by the scope of the following claims.

What is claimed is:

1. A method for blackout and retune distribution comprising:
   receiving a plurality of programs, wherein at least one of said plurality of programs is a blacked out program, and wherein the blacked out program is received using fixed bandwidth allocation;
   receiving a local replacement program;
   receiving a retune service, wherein receiving the retune service comprises of using dynamic bandwidth allocation;
   generating an aggregate stream comprising the received plurality of programs, the received local replacement program, and the received retune service.

2. A method for blackout and retune distribution comprising:
   receiving a non-blacked out feed and a blacked out feed, wherein the non-blacked out feed is transmitted using dynamic bandwidth allocation, and wherein the blacked out feed is transmitted using fixed bandwidth allocation;
   receiving a retune feed corresponding to a retune programming for the blacked out feed;
   combining the received non-blacked out feed, the received blacked out feed and the received retune feed to provide an aggregate wide area outbound traffic.

3. The method for blackout and retune distribution of claim 2, wherein receiving the retune feed comprises of using dynamic bandwidth allocation.

4. The method for blackout and retune distribution of claim 2, wherein receiving the retune feed comprises of using fixed bandwidth allocation.

5. A method for blackout and retune distribution comprising:
   separating an aggregate wide area outbound traffic into a retune feed, a blacked out feed and a non-blacked out feed, wherein the nonblacked out feed is transmitted using dynamic bandwidth allocation, and wherein the blacked out is transmitted using fixed bandwidth allocation;
   receiving the retune feed and the blacked out feed;
   replacing the blacked out feed with the retune feed; and
   providing an aggregate local outbound traffic including the non-blacked out feed and the retune feed.

6. A method for blackout and retune distribution comprising:
   receiving a plurality of non blacked out feeds, wherein the receiving the nonblacked out feed comprises using dynamic bandwidth allocation;
   receiving a blacked out feed, wherein the receiving blacked out feed comprises of using fixed bandwidth allocation;
   receiving a retune feed corresponding to a retune programming for the blacked out feed;
   applying dynamic bandwidth allocation to the plurality of non blacked out feeds; and
   combining the plurality of non blacked out feeds, the blacked out feed, and the retune feed for transmission as an aggregate wide area outbound feed.

7. A method for blackout and retune distribution comprising:
   receiving an aggregate wide area outbound feed comprising a plurality of non blacked out feeds and at least one blacked out feed, wherein at least one of the nonblacked out feeds is transmitted using dynamic bandwidth allocation, and wherein the at least one blacked out feed feeds is transmitted using fixed bandwidth allocation;
   receiving a plurality of local programming feeds;
   receiving a plurality of retune feeds; and
   combining the received aggregate wide area outbound feed, the received plurality of local programming feeds, and the received plurality of retune feeds for transmission an aggregate local area outbound feed.

8. A method for blackout and retune distribution comprising:
   receiving a plurality of non blacked out feeds; and
   applying dynamic bandwidth allocation to the plurality of non blacked out feeds;
   receiving a plurality of blacked out feeds;
   applying fixed bandwidth allocation to the plurality of non blacked out feeds;
   combining the plurality of non blacked out feeds and the plurality of blacked out feeds;
   transmitting the combined non blacked out and blacked out feeds as an aggregate wide area outbound feed.

9. A method for blackout and retune distribution comprising:
   receiving a remultiplexed feed comprising an aggregate wide area outbound feed and a plurality of retune feeds;
   receiving a multiplexed feed comprising a plurality of local program feeds;
   applying dynamic bandwidth allocation to the plurality of local program feeds;
   combining the remultiplexed feed and the multiplexed feed; and
   transmitting the combined remultiplexed feed and the multiplexed feed as an aggregate wide area outbound feed.

10. A method for blackout and retune distribution comprising:
    receiving a plurality of non blacked out feeds;
    applying dynamic bandwidth allocation to the plurality of non blacked out feeds;
    receiving a plurality of blacked out feeds;
    applying fixed bandwidth allocation to the plurality of blacked out feeds;
    receiving a fixed bandwidth retune program feed; and combining the plurality of non blacked out feeds, the plurality of blacked out feeds, and the fixed bandwidth retune program feed.

11. A blackout and retune distribution apparatus comprising:
   means for receiving a first wide area multiplexed feed, the first wide area multiplexed feed comprising a blacked out feed, wherein receiving the blacked out feed comprises using fixed bandwidth allocation;
   means for generating a requantized local service feed from a local replacement plus retune service feed, the local replacement plus retune service feed comprising a retune feed corresponding to a retune programming for the blacked out feed, wherein the requantized local service feed is to be combined with the first wide area multiplexed feed for transmission as a part of an aggregate local outbound traffic; and
   means for applying dynamic bandwidth allocation to the requantized local service feed.

12. The blackout and retune distribution apparatus of claim 11, wherein the local replacement plus retune service feed comprises a plurality of retune feeds and further comprising means for dropping unneeded services from the plurality of retune service feeds.

13. The blackout and retune distribution apparatus of claim 11, wherein the first wide area multiplexed feed further comprising a non-blacked out feed.

14. The blackout and retune distribution apparatus of claim 11, wherein the means for generating the requantized local service feed comprises:
   means for receiving an aggregate wide area operation infrastructure (WOI) traffic feed comprising the local replacement plus retune service feed and the first wide area multiplexed feed; and
   means for extracting the retune feed.

15. The blackout and retune distribution apparatus of claim 14, wherein the aggregate WOI traffic feed comprises a second wide area multiplexed feed and the means for generating the requantized local service feed further comprises means for extracting the first wide area multiplexed feed from the aggregate WOI traffic feed.

16. The blackout and retune distribution apparatus of claim 11, further comprising:
   means for receiving at least one optional local service feed; and
   means for multiplexing the optional local service feed and the requantized local service
   feed for combination with the first wide area multiplexed feed for transmission as part of an aggregate local outbound traffic.

17. The blackout and retune distribution apparatus of claim 16, further comprising applying dynamic bandwidth allocation to the at least one optional local service feed.

18. A non-transitory computer-readable medium having instructions stored thereon, the stored instructions, when executed by a processor, cause the processor to perform a method for blackout and retune distribution, the method comprising: receiving a first wide area multiplexed feed, the first wide area multiplexed feed comprising a blacked out feed, wherein the blacked out feed has a fixed bandwidth; and
   generating a requantized local service feed from a local replacement plus retune service feed, the local replacement plus retune service feed comprising a retune feed corresponding to a retune programming for the blacked out feed, wherein the requantized local service feed is to be combined with the first wide area multiplexed feed for transmission as a part of an aggregate local outbound traffic; and
   applying dynamic bandwidth allocation to the requantized local service feed.

19. The non-transitory computer-readable medium of claim 18, wherein the local replacement plus retune service feed comprises a plurality of retune feeds and the method further comprising dropping unneeded services from the plurality of retune service feeds.

20. The non-transitory computer-readable medium of claim 18, wherein the first wide area multiplexed feed further comprising a non-blacked out feed.

21. The non-transitory computer-readable medium of claim 18, wherein generating the requantized local service feed comprises:
   receiving an aggregate wide area operation infrastructure (WOI) traffic feed comprising
   the local replacement plus retune service feed and the first wide area multiplexed feed; and
   extracting the retune feed.

22. The non-transitory computer-readable medium of claim 21, wherein the aggregate WOI traffic feed comprises a second wide area multiplexed feed and generating the requantized local service feed further comprises extracting the first wide area multiplexed feed from the aggregate WOI traffic feed.

23. The non-transitory computer-readable medium of claim 18, further comprising:
   receiving at least one optional local service feed; and
   multiplexing the optional local service feed and the requantized local service feed for combination with the first wide area multiplexed feed for transmission as part of an aggregate local outbound traffic.

24. The non-transitory computer-readable medium of claim 23, further comprising applying dynamic bandwidth allocation to the at least one optional local service feed.

25. An apparatus for blackout and retune distribution comprising: a requantizer coupled to a wide area combiner to receive a retune feed from the wide area combiner, the requantizer generating a requantized local service feed from the retune feed, wherein dynamic bandwidth allocation is applied to the requantized local service; and
   a local combiner coupled to the requantizer and the wide area combiner, the local combiner receiving the requantized local service feed and a blacked out feed from the wide area combiner, wherein the blacked out feed is at a fixed bandwidth, and wherein the local combiner provides an aggregate local outbound traffic comprising the blacked out feed and the requantized local service feed.

26. The apparatus for blackout and retune distribution of 25, further comprising first wide area multiplex coupled to the wide area combiner, the first wide area multiplex receiving the blacked out feed and providing the blacked out feed to the wide area combiner.

27. The apparatus for blackout and retune distribution of 25, further comprising a local replacement plus retune service multiplex coupled to the wide area combiner, the local replacement plus retune service multiplex receiving the retune feed, the retune feed comprising a retune programming for the blacked out feed.

28. The apparatus for blackout and retune distribution of 27, wherein the wide area combiner is coupled to the first wide area multiplex and the local replacement plus retune service multiplex.

29. The apparatus for blackout and retune distribution of 25, further comprising a local multiplex coupled to the requantizer and the local combiner, wherein the local combiner is coupled to the requantizer through the local multiplex.

30. The apparatus for blackout and retune distribution of 25, wherein local combiner is coupled to at least one optional local service feed.

31. The apparatus for blackout and retune distribution of 30, further comprising a local multiplex coupled to the local combiner, wherein the local combiner is coupled to the at least one optional local service feed through the local multiplex.

32. The apparatus for blackout and retune distribution of 30, wherein dynamic bandwidth allocation is applied to the at least one optional local service feed.

33. An apparatus for blackout and retune distribution comprising:
   a multiplex receiving a blacked out feed and a non-blacked out feed, wherein the non-blacked out feed is transmitted using dynamic bandwidth allocation, and wherein the blacked out feed is transmitted using fixed bandwidth allocation;
   a retune multiplex receiving the non-blacked out feed and a retune feed corresponding to a retune programming for the blacked out feed; and
   a combiner coupled to the multiplex and the retune multiplex, the combiner providing an aggregate outbound traffic comprising the non-blacked out feed, the blacked out feed and the retune feed.

34. The apparatus for blackout and retune distribution of claim 33, wherein the multiplex receives a second blacked out feed and wherein the apparatus for blackout and retune distribution further comprising a second retune multiplex receiving a second retune feed corresponding to a second retune programming for the second blacked out feed, wherein the combiner is coupled to the second retune multiplex and the aggregate outbound traffic comprises the second retune feed.

35. An apparatus for blackout and retune distribution comprising: a wide area multiplex receiving at least one non-blacked out feed, the wide area multiplex providing an aggregate wide area outbound traffic comprising the non-blacked out feed and blacked out feed, wherein the non-blacked out feed has a dynamic bandwidth allocation, and wherein the blacked out feed has a fixed bandwidth allocation; and
   a local multiplex coupled to the wide area multiplex and receiving the aggregate wide area outbound traffic, at least one local feed, and a retune feed, wherein the local multiplex providing an aggregate local outbound traffic.

36. The apparatus for blackout and retune distribution of claim 35, wherein all retune feeds are carried in the local multiplex.

37. An apparatus for blackout and retune distribution comprising:
   a wide area multiplex receiving a non-blacked out feed and a blacked out feed, the wide area multiplex providing an aggregate wide area outbound traffic, wherein the non-blacked out feed has a dynamic bandwidth allocation, and wherein the blacked out feed has a fixed bandwidth allocation;
   a wide area re-multiplex coupled to the wide area multiplex, the wide area re-multiplex receiving a retune feed corresponding to a retune programming for the blacked out feed, the wide area re-multiplex configured to replace the blacked out feed from the aggregate wide area outbound traffic with the retune feed; and
   a local multiplex coupled to the wide area re-multiplex and receiving the non-blacked out feed, the retune feed and a local feed, wherein the local multiplex providing an aggregate local outbound traffic.

38. The apparatus for blackout and retune distribution of claim 37, wherein the retune feed is transmitted using fixed bandwidth allocation.

39. An apparatus for blackout and retune distribution comprising: a wide area multiplex receiving a non-blacked out feed and a blacked out feed, wherein the non-blacked out feed has a dynamic bandwidth allocation, and wherein the blacked out feed has a fixed bandwidth allocation;
   a combiner coupled to the wide area multiplex and receiving the non-blacked out feed and the blacked out feed, the combiner further receiving a retune feed corresponding to a retune programming for the blacked out feed, the combiner providing an aggregate wide area outbound traffic;
   a splitter coupled to the combiner, the splitter configured to separate the aggregate wide area outbound traffic into the retune feed, the blacked out feed and the non-blacked out feed;
   a wide area re-multiplex coupled to the splitter, the wide area re-multiplex receiving the retune feed and the blacked out feed, the wide area re-multiplex configured to replace the blacked out feed with the retune feed; and
   a local multiplex coupled to the wide area re-multiplex and receiving the non-blacked out feed, the retune feed and a local feed, wherein the local multiplex providing an aggregate local outbound traffic.

40. The apparatus for blackout and retune distribution of claim 39, where the retune feed is transmitted using fixed bandwidth allocation.

41. An apparatus for blackout and retune distribution comprising:
   a wide area multiplex receiving a non-blacked out feed and a blacked out feed, wherein the non-blacked out feed has a dynamic bandwidth allocation, and wherein the blacked out feed has a fixed bandwidth allocation, the wide area multiplex providing an aggregate wide area outbound traffic;
   a local multiplex receiving a local feed and a retune feed corresponding to a retune programming for the blacked out feed; and
   a combiner coupled to the wide area multiplex and the local multiplex, the combiner receiving the non-blacked out feed, the retune feed and a local feed, wherein the combiner providing an aggregate local outbound traffic.

42. The apparatus for blackout and retune distribution of claim 41, where the retune feed is transmitted using dynamic bandwidth allocation.

* * * * *